A. E. JEANS AND P. T. HAYES.
APPARATUS FOR AUTOMATICALLY FEEDING MELTING POTS OF TYPE BAR MAKING MACHINES.
APPLICATION FILED JUNE 24, 1919.
1,326,936.
Patented Jan. 6, 1920.
3 SHEETS—SHEET 3.
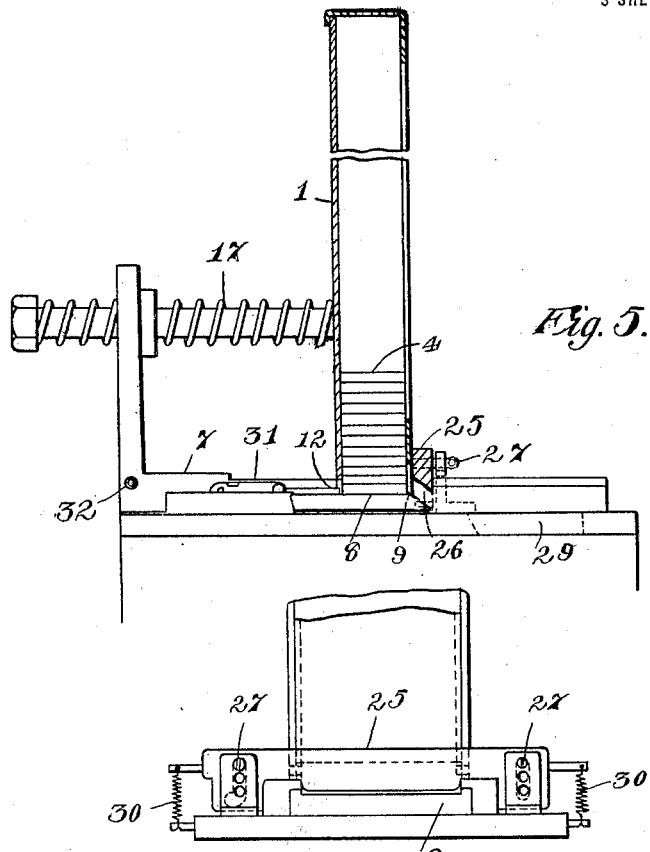
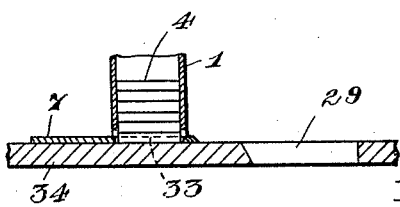

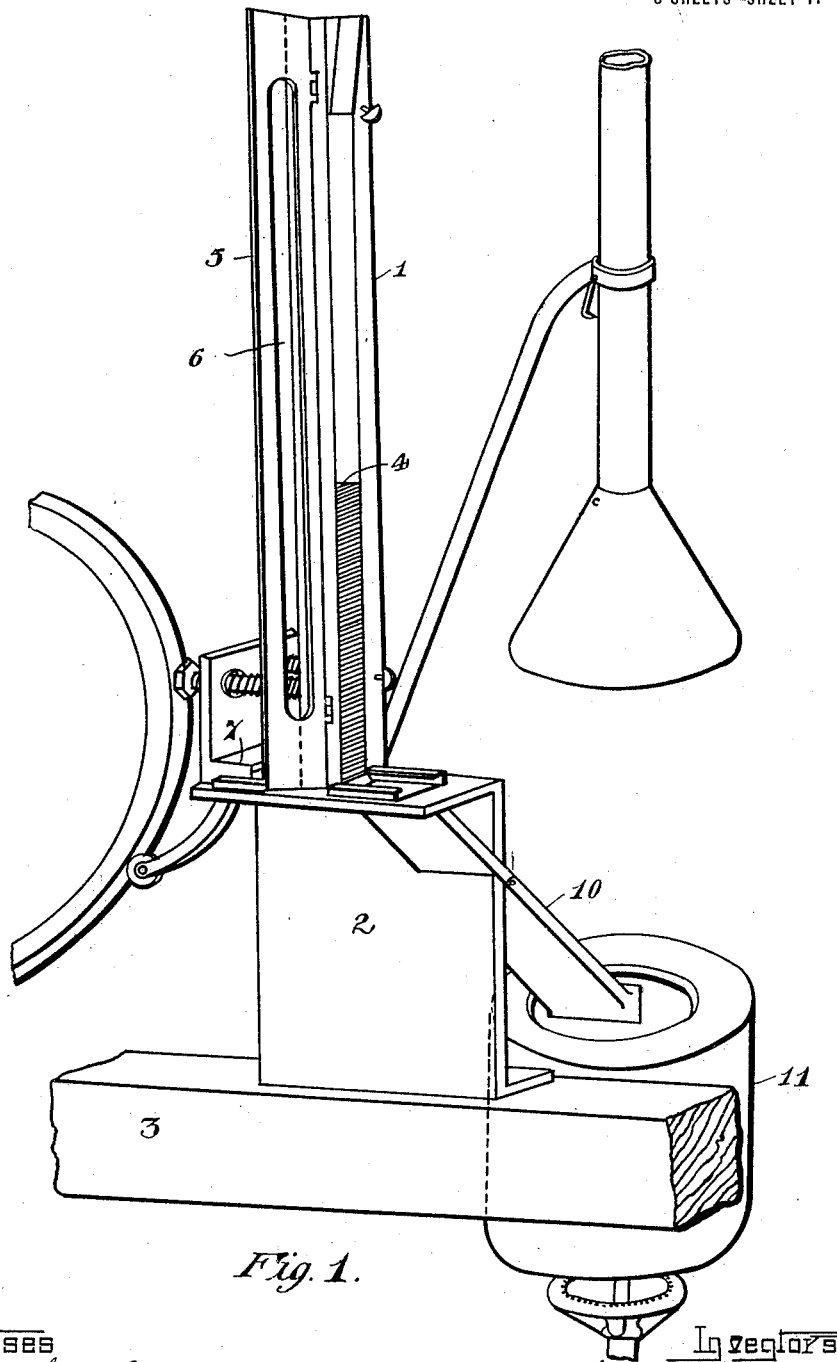

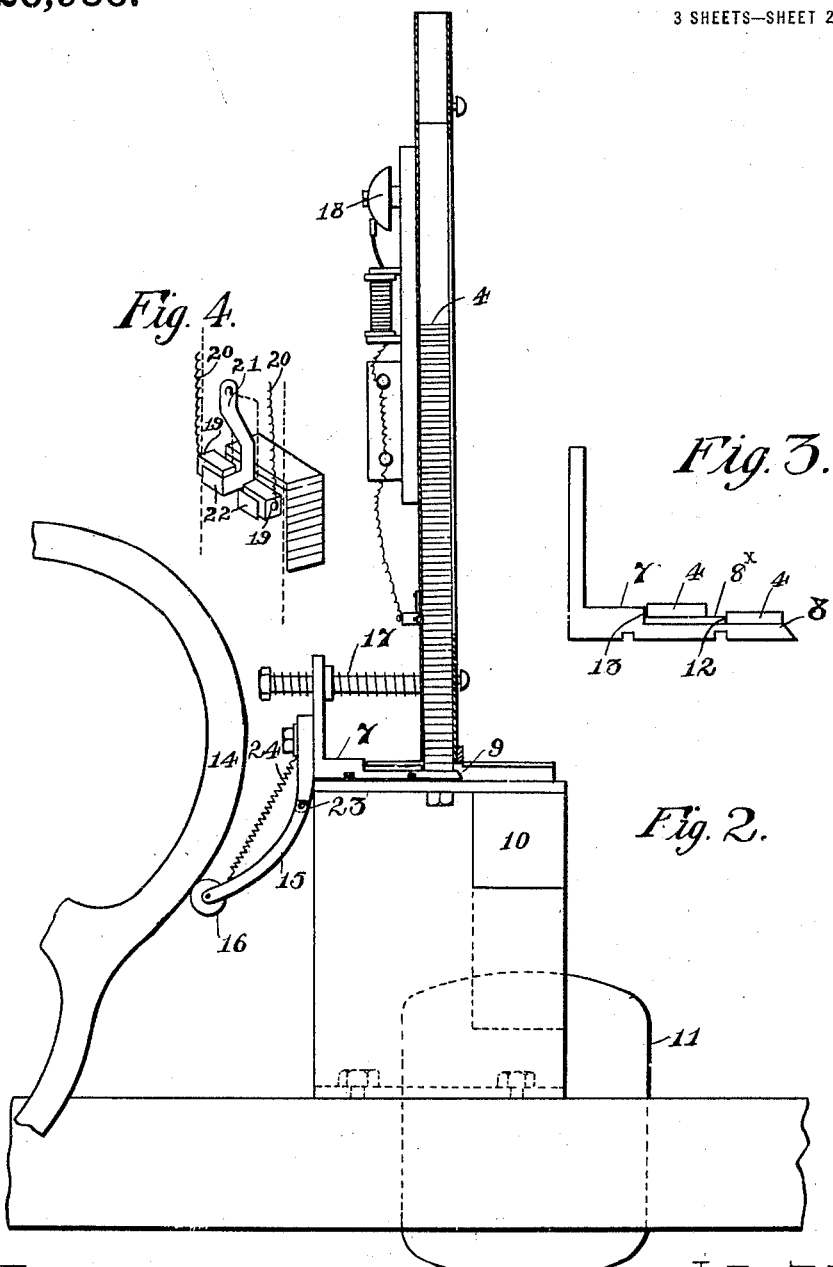

UNITED STATES PATENT OFFICE.

ALLAN EDGAR JEANS AND PETER THOMAS HAYES, OF LIVERPOOL, ENGLAND.

APPARATUS FOR AUTOMATICALLY FEEDING MELTING-POTS OF TYPE-BAR-MAKING MACHINES.

1,326,936. Specification of Letters Patent. Patented Jan. 6, 1920.

Application filed June 24, 1919. Serial No. 306,498.

*To all whom it may concern:*

Be it known that we, ALLAN EDGAR JEANS and PETER THOMAS HAYES, subjects of the King of Great Britain, residing at Liverpool, in the county of Lancaster and Kingdom of England, respectively, have invented certain new and useful Improvements in Apparatus for Automatically Feeding Melting-Pots of Type-Bar-Making Machines, of which the following is a specification.

This invention has reference to improvements in apparatus for automatically feeding the melting pots of machines for producing stereotyped lines or bars of type as a substitute for type setting.

At the present day melting pots are usually charged by throwing in used lines or bars of type by hand but there is always the danger of the attendant forgetting to keep the pot uniformly charged, with the result that the temperature of the molten metal becomes so much increased that the contents of the pot are burned, and necessitate the operator having to skim off the burnt portion chiefly the tin and antimony which being the lighter metals rise to the surface in burnt dross form, thus robbing the alloy of the very ingredients which are relied upon to give the metal the hardness necessary to produce suitable lines of type for printing, consequently such lines are liable to collapse under applied pressure.

Automatic feeds for melting pots are however known by the use of which a substantially uniform amount of metal and consequently a uniform heat can be maintained in the pot, and the present invention is, as already stated, an improved feed of this type by which the danger of the metal being robbed of its hard body ingredients is avoided.

Prior to this invention it has been proposed to sustain a column of type lines or bars within a magazine by the lid or top of a swinging melting pot upon which the bottom type line or bar rests, the swinging movement of the pot causing the type lines or bars to be fed from the magazine intermittently into the pot the metal being delivered into the pot only when the pot is swung to and from its casting position. Another arrangement was to make the magazine in the form of a hopper fixed to the top of the swinging pot, such hopper containing an endless chain by which a type bar was delivered from the hopper into the pot each time a type bar was cast in the mold, while another arrangement was to provide a horizontal type galley to receive the used type lines which were ejected automatically into the pot at intervals by the action of a spring through the medium of cords attached to a cross beam.

Now our improved feed comprises in combination an upstanding magazine for holding a plurality of type bars in a pile, a sliding carriage at the bottom thereof upon which the pile rests, means for operating the sliding carriage each time a line is cast by the type making machine so as to deliver a type line therefrom, and a chute adapted to take delivery of the line of type from the magazine and deliver it to the melting pot.

The invention will be understood from the following description reference being had to the accompanying drawings, in which:—

Figure 1 is a perspective view of the apparatus;

Fig. 2 is a vertical cross section thereof;

Fig. 3 is a detail view of the sliding carriage;

Fig. 4 is a detail view of part of the indicator device;

Fig. 5 is a vertical cross section of the apparatus showing a modification;

Fig. 6 is a front view thereof on a larger scale; and

Fig. 7 is a detail view showing a further modification.

According to this invention, the apparatus comprises a chamber or magazine 1 supported in an upstanding position by a bracket 2 bolted to the frame 3 of the casting machine in any suitable manner. The interior of this magazine 1 is of such shape in cross section as to approximately correspond to the shape and size of the lines or bars of type 4 when laid flat, so as to enable a plurality of such lines or bars to be stored therein one above the other in a pile or stack. The front of this magazine is formed with a door 5 which may if desired be provided with a window 6 through which the contents of the magazine are rendered visible, also a device (hereinafter described) is attached for indicating when nearly empty. The bottom of the magazine is provided with a sliding carriage 7 upon which the pile of lines of type 4 rests. This carriage 7 is moved automatically out and in, and the said carriage is so arranged as to push one line or bar of type 4 at a time (the bottommost one) through a lateral aperture 9 (which can be regulated according to the thickness of type in use) at the bottom of the magazine 1, and eject it down a chute 10 into the melting pot 11. This is effected according to Figs. 1, 2 and 3 by making the carriage in the form of a plate or tray having the forward part offset from the rear part 7 so as to form steps 8, $8^x$ these steps being on slightly lower planes than the rear part 7 thus forming shoulders 12, 13 between. The part 8 normally forms the bottom of the magazine 1, and upon it the pile of lines of type rests. When however the sliding plate or tray 7 is operated, the shoulder 12 acts as an abutment, and the tray conveys one line or bar of type 4 with it through the small lateral aperture to the outside of the magazine 1, whereupon the part $8^x$ forms for the time being the bottom of the magazine for the pile of types to rest on. The bar of type which has been carried forward by the sliding plate, cannot move back with the sliding plate on its return movement because the bar of type at the bottom of the pile that rests on the part $8^x$ forms an obstruction to its doing so. Consequently the sliding plate on its return motion causes the part 8 to slide back from under the said bar of type so that the latter falls down the chute 10 into the melting pot 11, and on the completion of the return motion of the sliding plate the pile in the magazine rests on the part 8 ready for the next delivery of a type bar. The part $8^x$ may be detachable if desired, so that it can be replaced by another one according to the thickness of type in use.

The sliding plate or tray is operated automatically each time a line is cast by the machine, by some suitable form of cam device which receives its motion from a moving part of the machine. This cam device may take the form of a rotating cam 14 against which an arm 15 secured to the slide 7 rests by means of an antifriction roller 16. The cam when turned slides the plate 7 forward and delivers a line of type to the pot and the sliding plate is drawn into the rearward position by means of springs such as 17 in readiness to travel forward again and convey another bar or line of type from the magazine to the chute by means of the cam. The arm 15 is jointed at 23 but is normally held rigid by a spring 24 so that the turning of the cam slides the carriage 7, the function of the spring 24 and joint 23 being to enable the arm 15 to give only under abnormal pressure in case there should be any obstruction which prevents the sliding carriage working freely.

In operation the magazine 1 is filled with a plurality of used lines or bars of type, and is kept filled either by hand or automatically. At each revolution of the machine when molding a line the cam 14 is operated so as to automatically slide the tray 7 and deliver one bar of type from the bottom of the pile in the magazine 1. The tray 7 slides back by the pull of the springs 17, and the whole of the remainder of the pile of lines in the magazine 1 drops down the magazine the space of one line each time the cam is operated. The chute 10 receives each line as it is pushed off the sliding plate or tray 7 and conducts it to the melting pot, and to prevent the hot metal splashing up as the lines are dropped into the melting pot, the chute may be made with a gentle slope so as to enable them to glide gently into the pot and will prevent any sudden impact with the molten metal. The magazine may be tilted rearwardly a little out of the perpendicular if desired.

The indicating device on the magazine comprises an automatic electric trembling bell 18, (Fig. 2) which is operated as follows:—In the center, on the back of the magazine, there is a vertically cut slot-hole, at the sides of which (at the bottom) are two insulated brass terminals 19 for attaching the bell and battery wires 20. At the top of the slot hole there is fixed by set screws, a strip 21 of spring metal, which has according to Fig. 4 a cross piece 22 fixed at the bottom. This cross piece is shaped to come into contact with the insulated brass terminals 19, and acts as a switch for automatically making and breaking the electric bell circuit 20. In other words, when the container 1 is filled with lines of type 4 higher than this slotted hole, the said lines press back the spring contact 21 and open the circuit. When the lines have become used up to below the bottom of the hole, the spring 21, having no opposition, springs inwardly, and brings the cross-piece 22 into contact with the terminal pieces 19 and rings the bell, which will continue ringing until attended to by the operator. It will of course be understood that I do not confine myself to this precise arrangement. For instance in Fig. 4, the lower end of the spring strip is intended to have a tapering part located between the terminals 19 which have correspondingly tapered surfaces, the said tapering part being pressed out of touching contact with the said terminals by the type bars in the magazine, except when such type bars have become used up to below the bottom of the strip, whereupon the said tapered end comes into contact with the terminals thus closing the circuit.

In the modification shown in Figs. 5 and 6, 7 the carriage is made in the form of a plate or tray having the forward part off-set so as to form a step 8 at a slightly lower plane than the rear part thus forming a shoulder 12 between. This part 8 normally forms the bottom of the magazine 1 and upon it the pile of type lines 4 rests. 9 is the aperture at the bottom of the magazine 1, through which the lines of type are ejected and in front of this aperture is located a horizontal gravity bar 25 whose lower edge 26 is chamfered on the inner side so that the lines of type as they are ejected from the magazine impact against this chamfered edge. The horizontal bar 25 is supported at each end by pins 27 passed through vertically slotted holes in the bar. The sliding plate 7 on being operated pushes a line of type through the aperture and causes it to impact against the chamfered edge 26 of the gravity bar thus lifting it and permitting the line of type to be delivered to the outside of the magazine, and the gravity bar thereupon drops down again. The line of type cannot move back with the sliding plate 7 because the gravity bar 25 forms an obstruction to its doing so and consequently the sliding plate on its return movement causes the part 8 to slide back from under the said lines of type so that the latter falls through the aperture 29 which leads to the chute and melting pot. A series of spaced holes one above the other may be provided for the pins 27, so as to enable the distance that the gravity bar falls to be regulated. Tension springs 30 may also be provided to pull the gravity bar downward so as to insure that the bar shall form an obstruction against the line of type moving back with the carriage 7. In case it should be desired to stop the delivery of lines of type from the magazine without stopping the casting of the lines of type, a hinged catch 31 is provided. A claw at the end of this catch can be made so as to engage a pin 32 on the carriage and so hold the carriage in the forward position with the spring 17 in compression. In this position the carriage 7 lies clear of the cam marked 14 in Fig. 2.

Another arrangement is to make the carriage 7 with a bottomless aperture 33 sufficiently large to allow the bottom-most bar of type to drop into, from the magazine 1 as shown in Fig. 7. The said carriage 7 slides upon an imperforate plate 34, which prevents the said line of type falling through the bottomless aperture 33 when the carriage is in the drawn back position, but when the carriage is pushed forward, it conveys the bottom-most line of type in the pile 4 to the outside of the magazine 1, where it falls through the aperture 29 and so down the chute to the melting pot. The rearward part of the carriage which has no aperture in it prevents any more bars of type being delivered from the magazine until the carriage is slid back and its aperture 33 comes into coincidence with the magazine.

We declare that what we claim is:—

1. In apparatus for automatically feeding the melting pots of type bar making machines, the combination with a non-swinging melting pot, of a magazine for holding a plurality of type bars in a pile, a sliding carriage at the bottom thereof in the form of a sliding plate having one part off-set from another part so as to form an abutment adapted to act against one or more lines or bars of type at a time in the magazine to deliver them to a chute feeding the melting pot.

2. In apparatus for automatically feeding the melting pots of type bar making machines, the combination with a non-swinging melting pot, of a magazine for holding a plurality of type bars in a pile, a sliding carriage at the bottom thereof in the form of a sliding plate, a horizontal gravity bar located in front of the aperture through which the lines of type are ejected the said gravity bar being so arranged that it is pushed up when the sliding plate delivers a line of type from the magazine, but forms an obstruction to the lines of type being returned with the slide.

3. In apparatus for automatically feeding the melting pots of type bar making machines, the combination with a non-swinging melting pot, of a magazine for holding a plurality of type bars in a pile, a sliding carriage at the bottom thereof in the form of a sliding plate having a bottomless aperture sufficiently large to allow the bottom-most type bar in the magazine to drop into, and an imperforate plate upon which the carriage is arranged to slide in such manner as to prevent the type bar falling through except when the sliding carriage is operated to deliver a type bar to the chute.

4. In apparatus for automatically feeding the melting pots of type bar making machines the combination with a non-swinging melting pot of a magazine for holding a plurality of type bars in a pile, a sliding carriage for delivering a type bar each time a line is cast by the machine, a vertically cut slot hole at the back of the magazine, a brass terminal at each side thereof in the circuit of a bell and battery, and a spring contact piece so arranged that when the magazine is filled with lines of type higher than the slotted hole, the said lines press back the contact and open the circuits, but when such lines fall below a given point, the contact piece having no opposition springs inwardly and comes in contact with the terminals thus ringing the bell.

In witness whereof we have hereunto signed our names this 6th day of June, 1919, in the presence of two subscribing witnesses.

ALLAN EDGAR JEANS.
PETER THOMAS HAYES.

Witnesses:
F. G. WILLIAMS,
J. McLACHLAN.